Dec. 20, 1966   M. H. WERTHER   3,293,046
PRESERVATION OF VEGETABLE PRODUCTS
Filed July 31, 1961
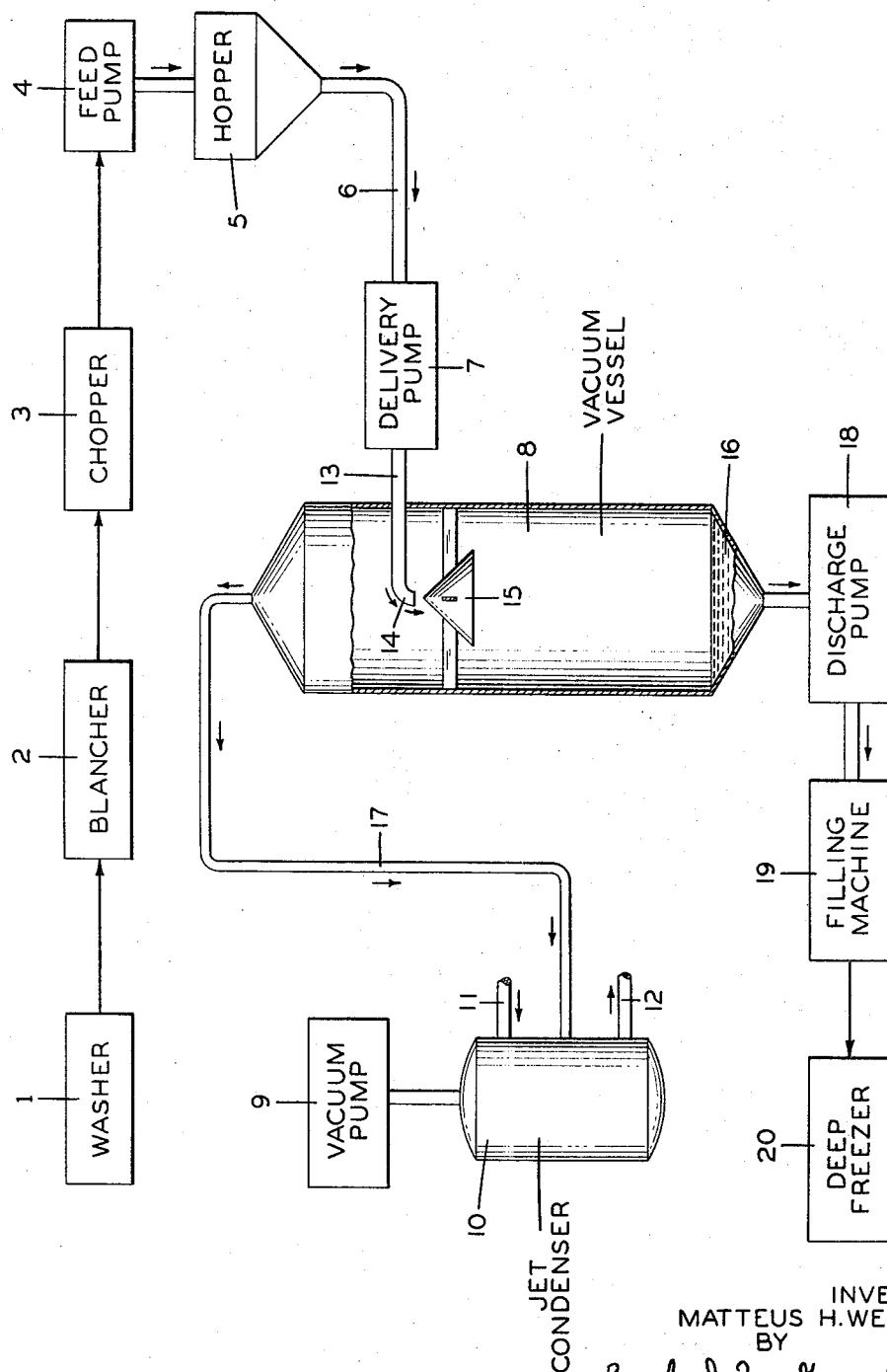
INVENTOR
MATTEUS H. WERTHER
BY
Brumbaugh, Free, Graves & Donohue
HIS ATTORNEYS

United States Patent Office 3,293,046
Patented Dec. 20, 1966

3,293,046
PRESERVATION OF VEGETABLE PRODUCTS
Matteus Hendrikus Werther, Zwollerkerspel, Netherlands, assignor to Lever Brothers Company, New York, N.Y., a corporation of Maine
Filed July 31, 1961, Ser. No. 127,993
Claims priority, application Great Britain, Aug. 8, 1960, 27,428/60
6 Claims. (Cl. 99—154)

This invention relates to processes for treating liquid-containing food products, especially vegetables, for example spinach. The invention also relates to apparatus for carrying out such processes.

The invention in its broadest aspect consists in a process for treating a liquid-containing food product, which process comprises liquidising the product, introducing the liquidised product into an enclosed vessel in which a subatmospheric pressure is maintained whereby gas contained in the product is removed, and withdrawing the degassed liquidised food product from the vessel.

"Liquidising" a product is to be understood to mean subjecting the product to a mechanical treatment, such as, for example, a crushing, grinding, mashing, or a chopping up treatment, to reduce it to a flowable or pumpable state, without the addition of any liquid, by liberating the natural liquids contained in the product.

One important embodiment of the process of the invention comprises the process steps of blanching the product by heating it at an elevated temperature, liquidising the product, while it is still hot from the blanching, introducing the hot liquidised product into an enclosed vessel in which a subatmospheric pressure is maintained whereby gas contained in the product is removed and the liquidised product is cooled by evaporation of part of the liquid, and withdrawing the degassed and cooled liquidised food product from the vessel.

Other features of the invention will be apparent from the following detailed description of one embodiment of the invention which is to be read in conjunction with the accompanying schematic drawing which shows a representation of apparatus suitable for the processing of spinach.

Referring to the drawing, spinach for processing is first washed at a washing station 1 from which it is passed to a blanching station 2. At the blancher 2, the spinach is heated in water at about 100° C. for a period of time sufficient to destroy the ferments. The blanched spinach, after removal from the hot water, is passed, while still hot, to a chopper 3 where it is finely disintegrated to liquidise it, that is to say the spinach is brought to a pumpable slurry state, without the addition of liquid, by the liberation of the natural fluids contained in it.

The spinach slurry is now, while still hot, transferred by means of a feed pump 4 to a hopper 5 and then through supply conduit 6 to a delivery pump 7. The pump 7 injects the liquidised product into an enclosed vacuum vessel 8 immediately adjacent the pump 7. A vacuum of about 73 cm. of mercury is maintained in the vessel 8 by means of a vacuum pump 9. In the vacuum line between the pump 9 and vessel 8 there is arranged a jet condenser 10 for condensing vapour given off from the hot liquidised spinach when it is introduced into the vacuum vessel 8. A cooling water inlet conduit of the jet condenser 10 is shown at 11 and a discharge conduit for the cooling water and condensed vapour is shown at 12.

The delivery pump 7 is of such kind that it enables the hot liquid spinach to be transferred to the vacuum vessel 8 while direct fluid communication between the vessel 8 and the supply conduit 6 is prevented. It has been found particularly advantageous to include a delivery pump of this kind in the supply line and furthermore to position it immediately adjacent the vacuum vessel 8, the pump 7 and vessel 8 being connected by a conduit 13 which is as short as it can conveniently be made. The use of such a pump ensures that at no time in the opration of the process is it possible for the vacuum in vessel 8 to be propagated up-stream of the pump 7. The pump 7 is operated in such manner that the pressure of the slurry throughout substantially the whole length of conduit 13 is higher than the vapour pressure of water at the temperature of the slurry in conduit 13. By this means any substantial vapourisation of the water of the spinach while the spinach is in the conduit 13 is prevented. Experiments have shown that operation difficulties are encountered if substantial vapourisation occurs in the supply conduit to the vacuum vessel. It will be clear that the above operative conditions are more easy to obtain the shorter in the length of the conduit 13. In practice a conduit of length 10 cm. has been used; however, longer lengths may be provided the above condition regarding the pressure of the slurry in conduit 13 is fulfilled.

The slurry pump 7 may be of any suitable kind; a particularly satisfactory type of pump enabling the above desired conditions to be readily fulfilled is the Mono pump. A Mono pump is a helical gear pump comprising a resilient stator, having a rotor opening or pumping chamber provided with internal helical grooves or threads, and a rotor adapted to mate with the stator and provided with external grooves or threads, the stators having one groove or thread more than the rotor. Suitable positive displacement pumps may also be used.

The hot liquidised spinach from the pump 7 is transferred under pressure along the short conduit 13 and is delivered into the body of the vessel 8 through an outlet orifice 14. The orifice 14 may be in the form of a nozzle to assist in ensuring that the desired pressure conditions prevail in the conduit 13. The orifice 14 is arranged above a cone-shaped distributing device 15 over which the hot liquidised spinach is dispersed and flows as a thin layer and an extended spinach surface is thereby exposed to the vacuum. Gases contained in the liquidised spinach are withdrawn by the action of the vacuum as the liquid product flows from the outlet 14 over the surface of the distributor 15 and falls to collect at 16. Furthermore, simultaneously with the degassing, flash evaporation of a part of the hot water of the slurry occurs due to the sudden exposure of vacuum to the hot product and substantial cooling of the product by withdrawal of heat of evaporation is effected. The evaporated liquid is drawn through line 17 and is condensed by jets of cooling water introduced into the steam space of the jet condenser 10 and the condensed water is removed with the cooling water through pipe 12. It has been found that the employment of the cone distributor 15, or some equivalent device, to provide a large surface area of the spinach slurry exposed to the vacuum, improves the efficiency of the degassing and the flash evaporation cooling. In practice, spinach slurry at 80–85° C. was injected into the vessel 8 and deaerated and simultaneously cooled to about 26° C. The degree of vacuum in the vessel 8 should be sufficient to enable the slurry to be cooled to less than 30° C., preferably from 24 to 27° C. If the temperature is much higher the product is difficult to deep-freeze.

The cooled and degassed spinach is transferred by means of a discharge pump 18 directly to a filling station 19 and filled into containers which are then deep-frozen at −40° C. at a deep-freezer station 20.

The above described continuous process for the treatment of spinach, which process can readily be performed on a commercial scale, embodies a number of advantageous features. Among the advantages obtained may be mentioned those of effecting simultaneously the cooling and degassing of the blanched product, no loss of nutrient constituents in the cooling (such as would be the case if cooling were effected, prior to liquidising, by running cold water), no liquids are added or mixed with the product during the treatment, and the water content of the product is reduced by the evaporative cooling. Furthermore, the treated product is substantially completely deaerated and so the packed spinach is less liable to oxidative deterioration, the bulk density of the product is increased and consequently a smaller pack is required for the same weight of product, the filling operation is easier and can be carried out with greater precision resulting in a saving of product, and a further advantage of the absence of air is that the freezing time can be reduced. By liquidising the product while it is at an elevated temperature, one gains the further advantage that less energy is required for chopping up the spinach.

What is claimed is:

1. A process for treating a liquid-containing vegetable which comprises blanching the vegetable by heating it at an elevated temperature; liquidizing the vegetable by mechanical disintegration while it is still hot from the blanching without the addition of liquid by liberating the natural fluids contained therein; subjecting the hot liquidized vegetable to a subatmospheric pressure whereby gas contained in the vegetable is removed and the liquidized product is cooled by evaporation of part of the liquid of the product; and withdrawing the degassed and cooled liquidized vegetable from the influence of said subatmospheric pressure.

2. In a process of preserving a liquid-containing vegetable, the steps of: heating the vegetable at an elevated temperature for a period of time sufficient to destroy any ferments; subjecting the vegetable while still hot to a mechanical disintegration treatment to convert it into a slurry without the addition of any liquid by releasing the natural fluids contained therein; subjecting the hot slurried vegetable to a subatmospheric pressure to simultaneously degas and cool the vegetable; withdrawing the cooled and degassed vegetable from the influence of said subatmospheric pressure; and packaging the processed vegetable.

3. In a process of preserving a liquid-containing vegetable; the steps of: heating the vegetable at an elevated temperature for a period of time sufficient to destroy any ferments; liquidizing the vegetable by mechanical disintegration while still hot by releasing the natural fluids contained therein; pumping the hot liquidized vegetable into a zone maitnained at a subatmospheric pressure and holding the vegetable in said zone for a period of time sufficient to degas the said vegetable and cool it to the desired extent; withdrawing the cooled and degassed liquidized vegetable from said zone; and packaging the processed vegetable.

4. A process as claimed in claim 3 in which the pressure of the liquidized vegetable prior to introduction into the subatmospheric pressure zone is maintained at such a value that substantially no vaporization of the liquid of the vegetable occurs until said vegetable passes into said zone.

5. A process as claimed in claim 3, in which the hot liquidizied vegetable is cooled in said subatmospheric pressure zone to below 30° C.

6. A process as claimed in claim 3, in which the liquid-containing vegetable is spinach.

References Cited by the Examiner
UNITED STATES PATENTS

| | | | |
|---|---|---|---|
| 1,982,944 | 12/1934 | Anderson | 99—100 |
| 2,035,619 | 3/1936 | Robison | 99—155 |
| 2,047,935 | 7/1936 | Beal | 99—155 |
| 2,078,565 | 4/1937 | Durst et al. | 25—14 |
| 2,276,261 | 3/1942 | Buzard | 25—14 |
| 2,453,109 | 11/1948 | MacDowell | 99—205 X |
| 2,581,484 | 1/1952 | Helgerud | 99—154 |
| 2,631,105 | 3/1953 | Henszey | 99—200 |

OTHER REFERENCES

Tressler et al., "The Freezing Preservation of Foods," vol. I, Westport, Conn., 1957, p. 591.

A. LOUIS MONACELL, *Primary Examiner.*

ABRAHAM H. WINKELSTEIN, *Examiner.*

G. MANN, R. S. AULL, *Assistant Examiners.*